is ordinarily prepared and sold in the form of a
UNITED STATES PATENT OFFICE 2,613,155

VISCOSITY-STABLE CASEIN ADHESIVES

Thomas Aubrey White, Jackson Heights, N. Y., assignor to National Starch Products Inc., New York, N. Y., a corporation of Delaware No Drawing. Application May 26, 1949, Serial No. 95,580

6 Claims. (Cl. 106—138)

My invention relates to an improved casein adhesive particularly characterized by water resistance, long working life, and controlled viscosity.

More particularly, it is my object to produce an adhesive for use in adhering labels to bottles, the adhesive being characterized by resistance to the action of "ice" water, in which many bottles, particularly those containing so-called soft beverages and beer, are often immersed. As compared to presently known adhesives of this type, it is my object to achieve a product which is characterized not only by improved properties, but by greater economy of manufacture.

Generally speaking, casein-base adhesives may be divided into two types. One, the so-called unstable or short working life, quick-setting type, is ordinarily prepared and sold in the form of a dry mix. This is due to the fact that after mixing with water to form an adhesive, this product has a useful working life of only a matter of hours, since it quickly thickens to an unusable mass. This type of casein adhesive is characterized by having calcium hydroxide or other alkaline earth as the chief solubilizing agents for the casein.

The second is the stable type. Such adhesives have the great advantage of long working life; that is, when mixed with water, they do not thereafter thicken rapidly, but, on the contrary, maintain a relatively constant viscosity for long periods of time. In view of their viscosity stability, these stable casein-type adhesives are often manufactured and distributed in the form of the final liquid formulation. In this type of casein adhesive, the chief water dispersing or solubilizing agents for the casein may be ammonium hydroxide, urea, ammonium thiocyanate, sodium salicylate borax, sodium hydroxide, and the like, of which the prime and necessary solubilizing agent is selected from the group of urea and ammonium thiocyanate. However, it has heretofore been considered necessary, without exception, that any alkaline earths (such as are used in the above-mentioned unstable, quick-setting types) be rigidly excluded, lest stability be sacrificed.

This apparent necessity for the exclusion of alkaline earths, however, has brought about a problem in the industrial manufacture and use of these long working life, stable-type casein adhesives. The effect of the above-mentioned casein dispersants used in the stable-type adhesives (i. e., ammonia, urea, etc.) is to produce an adhesive of relatively thin viscosity, as compared to the effect of alkaline earth dispersants. In order to increase the viscosity of such adhesives to a point which would meet the exacting specifications of present-day automatic high-speed labeling machines, it has been attempted to increase the proportion of casein in the adhesive. Not only is this an uneconomical expedient, but it brings about certain disadvantageous properties in the product, including excessive tackiness and poor spreadability of the adhesive film. In other words, the problem has been to increase the viscosity without sacrificing stability, economy, or the working properties of the adhesive.

In connection with both of the above-mentioned types of casein adhesives (the unstable and stable types), various materials have been added in order to improve certain of their characteristics. Thus, zinc compounds are employed in order to bring about better water resistance of the dried adhesive film—as, for example, in case of paper labels attached to bottles; also, various flours and vegetable meals—such, for example, as soya meal—are sometimes added as fillers or "shorteners" (that is, in order to produce relatively non-stringy, non-fibering texture). However, none of these heretofore-known additions have met the problem of economically increasing and controlling the viscosity of the long working life, stable-type casein adhesive without, at the same time, sacrificing the all-important viscosity-stability of such adhesives. It must be emphasized that any change in the formulation of the stable-type casein adhesive which reduces its stability—that is, which causes it to thicken relatively quickly—destroys its usefulness for many industrial purposes. As already stated, much modern packaging and labeling is done on automatic, high-speed machines. Thus, any substantial change in the consistency of an adhesive may result in the faulty operation of such a machine, with subsequent damage to substantial quantities of packages, labeled goods, or the like.

As stated, it has been generally believed that the addition to the stable-type casein adhesives of even the slightest proportion of alkaline earth chemicals—such as the hydroxides or salts of calcium, barium, and the like—would result in the reversion of these adhesives to the unstable, quick-setting type; that is, the presence of the alkaline earth chemicals would cause the casein adhesives to increase rapidly in consistency so that their working life would be relatively short. In other words, it was believed that the addition of such alkaline earths would result in an adhesive characterized by uncontrolled increase in viscosity.

I have now discovered that, contrary to past belief and practice, the stable-type casein adhesives may be subjected to a controlled increase in viscosity, without loss of stability or deterioration of working properties, by the addition of small, carefully controlled amounts of alkaline earth bases or salts. It will be understood that the term "alkaline earth" covers a number of compounds, but the class is well known. As examples of alkaline earth compounds which may be used in my invention, there may be mentioned the compounds of calcium, barium, and strontium, such as barium acetate, barium hydroxide, barium carbonate, barium chloride, barium oxide, calcium nitrate, calcium chloride, strontium acetate. By "small" proportions of the alkaline earth material, I refer to quantities preferably no greater than ten per cent. (10%) based upon the dry weight of the casein. This in the liquid or paste formulation of the adhesive would amount generally to a proportion no greater than two per cent. (2%) by weight of the adhesive paste. Greater quantities of alkaline earth materials would negate the value of my product by increasing the viscosity to beyond the point of industrial usefulness.

Thus, my invention consists in the compounding of a stable type of casein adhesive which contains, besides the usual known ingredients for such compounds, no more than ten per cent. (10%) by weight of an alkaline earth base or salt based upon the dry weight of the casein.

Methods of making both the stable and unstable types are well known to those familiar with the art. The basic requirements of the stable, long working life type adhesive, with which we are here concerned, are casein, water, and sufficient casein dispersant or solubilizer—such as urea, ammonium hydroxide, ammonium thiocyanate, borax, sodium hydroxide, and the like—to disperse the casein; also, such modifying chemicals, fillers, preservatives, perfumes, and other additives as may be desired. Of course, the water may be omitted, the composition being distributed in dry form—to be mixed with water at the point of use. In view of the stability of this type of adhesive, however, it is entirely feasible to prepare it in its final liquid form. It will be apparent to those familiar with the manufacture of such adhesives that the particular proportion of the various ingredients will vary with the circumstances and requirements of their use (i. e., type of materials to be adhered, the kind of labeling machines used, etc.).

The quantity of alkaline earth material to be added to the adhesive depends upon the particular viscosity desired in the final product.

The following examples will further illustrate the embodiment of my invention:

*Example I*

In this and the other examples, all parts given are by weight.

The following ingredients are mixed, and heated to approximately 195° F., with continuous agitation, forming a homogeneous, creamy paste:

50.0 parts water
20.0 parts casein
1.0 part barium hydroxide
1.0 part zinc oxide
15.0 parts urea
10.0 parts ammonium thiocyanate
0.2 part phenol.

When the above formulation, minus the barium hydroxide, is tested for viscosity by the Hoeppler viscosimeter, at 72° F., it registers a viscosity of 8,900 centipoises. When prepared with the barium hydroxide, the centipoise value rises to 25,100, a desired working consistency for certain industrial applications. After aging for six (6) months, the above formulation containing the barium hydroxide is still characterized by the desired working consistency. In other words, the viscosity of the product is increased to a desired working consistency by the addition of the alkaline earth material and, on the other hand, the stability of the product is maintained thereafter.

*Example II*

The following ingredients are mixed, and heated to approximately 195° F., with continuous agitation, forming a homogeneous, creamy paste:

50.0 parts water
2.0 parts strontium chloride
20.0 parts casein
0.5 parts zinc oxide
10.0 parts urea
10.0 parts sodium salicylate
2.0 parts soya flour
0.6 part borax
0.2 part phenol.

The above formulation, minus the strontium chloride, when tested for viscosity by the Hoeppler viscosimeter, at 72° F., registers a viscosity of 25,100 centipoises. The same formulation, prepared with the strontium chloride, registers 47,900 centipoises, a desired working consistency in industrial applications where a relatively higher viscosity is needed. Here, too, after six (6) months' aging, the product is still characterized by the desired working consistency.

*Example III*

The following ingredients are mixed, and heated to approximately 195° F., with continuous agitation, forming a homogeneous, creamy paste:

55.0 parts water
0.5 part calcium nitrate
20.0 parts casein
1.0 part zinc oxide
5.0 parts urea
1.0 part borax
15.0 parts ammonium thiocyanate
0.2 part phenol.

The above formulation, minus the calcium nitrate, when tested for viscosity by the Hoeppler viscosimeter, at 72° F., registers a viscosity of 10,000 centipoises. The same formulation, prepared with the calcium nitrate, registers 16,600 centipoises. After six (6) months' aging, the product is still characterized by the desired working consistency.

In the above examples, the function of the various ingredients noted will be apparent to those familiar with the art. Thus, the urea, sodium salicylate, and ammonium thiocyanate are casein dispersants or peptizers, of which the prime and necessary solubilizing agent is selected from the group of urea and ammonium thiocyanate. It will be seen from the above examples that urea and ammonium thiocyanate, singly or in combination, are present in the compositions in the proportions of at least 50%, based on the dry weight of the casein. The borax is used for pH adjustment, since it is found that casein formulations are best prepared at a pH either neutral or slightly alkaline. The phenol is used, of course, as a preservative for the liquid adhesive, and numerous other suitable preservatives may be used in its place. The zinc oxide is employed in order to bring about better water resistance of the dried adhesive film—as, for example, in the case of paper labels attached to bottles. The function of the soya flour is as a filler or "shortener."

In the various formulations listed above, if alkaline earths had not been used, it would have been possible to obtain the desired viscosity without substantial loss of stability by increasing the casein content. However, it is found that this expedient is not only expensive—and, therefore, frequently economically unfeasible—but the properties of the adhesive are often adversely affected, being particularly characterized by excessive tackiness and poor spreading qualities. On the other hand, as has already been pointed out, it had heretofore been considered that the use of alkaline earth compounds to adjust viscosity was entirely impossible for the stable type of casein adhesive, since it had been believed that the presence of any quantity of alkaline earth compound would cause the casein adhesive to revert to the unstable, short working life type.

Summarizing, by the invention herein described, it is now possible to produce economically a stable casein adhesive characterized by long working life, wherein alkaline earth compounds in the small quantities herein noted are used as the means for obtaining the desired stable viscosity.

I claim:

1. A viscosity-stable casein adhesive comprising casein as the adhesive component, a casein solubilizer of which the prime and necessary solubilizing agent is selected from the group consisting of urea and ammonium thiocyanate, the urea and ammonium thiocyanate, singly or in combination, being present in the proportion of at least 50%, based on the dry weight of the casein, such adhesive when mixed with water producing an adhesive paste which is substantially stable and has a working life of at least several months, said adhesive having added thereto an alkaline earth compound in a proportion not more than ten per cent. (10%) in weight based on the dry weight of the casein, the added alkaline earth compound acting to increase the viscosity of the adhesive paste while retaining the stability and long working life thereof.

2. A viscosity-stable casein adhesive paste suitable for bottle labels, comprising water as the vehicle, casein as the adhesive component, a casein solubilizer of which the prime and necessary solubilizing agent is selected from the group consisting of urea and ammonium thiocyanate, the urea and ammonium thiocyanate, singly or in combination, being present in the proportion of at least 50%, based on the dry weight of the casein, such adhesive being substantially stable and having a working life of at least several months, said adhesive paste having added thereto an alkaline earth compound in a proportion not more than ten per cent. (10%) in weight based on the dry weight of the casein, the added alkaline earth compound acting to increase the viscosity of the adhesive paste while retaining the stability and long working life thereof.

3. A viscosity-stable casein adhesive paste suitable for bottle labels, comprising water as the largest component, casein as the adhesive component, a casein solubilizer in an amount in weight less than the casein of which the prime and necessary solubilizing agent is selected from the group consisting of urea and ammonium thiocyanate, the urea and ammonium thiocyanate, singly or in combination, being present in the proportion of at least 50%, based on the dry weight of the casein, such adhesive paste being substantially stable and having a working life of at least several months, said adhesive paste having added thereto an alkaline earth compound in a proportion not more than two per cent. (2%) in weight based on the weight of the adhesive paste, the added alkaline earth compound acting to increase the viscosity of the adhesive paste while retaining the stability and long working life thereof.

4. A viscosity-stable casein adhesive suitable for bottle labels, such adhesive comprising casein as the adhesive component, a casein solubilizer of which the prime and necessary solubilizing agent is selected from the group consisting of urea and ammonium thiocyanate, the urea and ammonium thiocyanate, singly or in combination, being present in the proportion of at least 50%, based on the dry weight of the casein, a zinc compound acting to increase the water resistance of a label containing the adhesive and adhered to a bottle, such adhesive when mixed with water producing an adhesive paste which is substantially stable and has a working life of at least several months, said adhesive having added thereto an alkaline earth compound in a proportion not more than ten per cent. (10%) in weight based on the dry weight of the casein, the added alkaline earth compound acting to increase the viscosity of the adhesive paste while retaining the stability and long working life thereof.

5. A viscosity-stable casein adhesive paste suitable for bottle labels, such adhesive comprising water as the vehicle, casein as the adhesive component, a casein solubilizer of which the prime and necessary solubilizing agent is selected from the group consisting of urea and ammonium thiocyanate, the urea and ammonium thiocyanate, singly or in combination, being present in the proportion of at least 50%, based on the dry weight of the casein, a zinc compound acting to increase the water resistance of a label containing the adhesive and adhered to a bottle, such adhesive paste being substantially stable and having a working life of at least several months, said adhesive paste having added thereto an alkaline earth compound in a proportion not more than ten per cent. (10%) in weight based on the dry weight of the casein, the added alkaline earth compound acting to increase the viscosity of the adhesive paste while retaining the stability and long working life thereof.

6. A viscosity-stable casein adhesive paste suitable for bottle labels, such adhesive comprising water as the largest component, casein as the adhesive component, a casein solubilizer in an amount in weight less than the casein of which the prime and necessary solubilizing agent is selected from the group consisting of urea and ammonium thiocyanate, the urea and ammonium thiocyanate, singly or in combination, being present in the proportion of at least 50%, based on the dry weight of the casein, a zinc compound acting to increase the water resistance of a label containing the adhesive and adhered to a bottle, such adhesive being substantially stable and having a working life of at least several months, said adhesive paste having added thereto an alkaline earth compound in a proportion not more than two per cent (2%) in weight based on the weight of the adhesive paste, the added alkaline earth compound acting to increase the viscosity of the adhesive paste while retaining the stability and long working life thereof.

THOMAS AUBREY WHITE.

REFERENCES CITED

The following references are of record in the file of this patent:

UNITED STATES PATENTS

| Number | Name | Date |
|---|---|---|
| 2,266,736 | Bradshaw | Dec. 23, 1941 |
| 2,351,109 | Corwin et al. | June 13, 1944 |
| 2,436,239 | Weisberg et al. | Feb. 17, 1948 |
| 2,581,111 | Landes et al. | Jan. 1, 1952 |
| 2,581,112 | Landes et al. | Jan. 1, 1952 |